3,372,208
FLAME RESISTANT EPOXY RESINS CONTAINING PHOSPHORUS AND A HALOGEN
Rolland M. Waters, Beltsville, Md., and John C. Smith, Houston, Tex., assignors to Dow Chemical Company, Midland, Mich., a corporation of Delaware
No Drawing. Filed Mar. 20, 1964, Ser. No. 353,571
7 Claims. (Cl. 260—830)

ABSTRACT OF THE DISCLOSURE

This application discloses and claims a flame retardant thermosettable epoxy resin consisting essentially of a polyepoxypolyhalophosphonate produced by first forming an adduct by reacting (a) at least 3 moles of a polyepoxide containing more than one 1,2-epoxy group per molecule with (b) one mole of a phosphorus trihalide followed by a rearrangement of that adduct by a heat treatment.

---

This invention relates to epoxy resins having flame resistant properties. More particularly, the invention concerns flame resistant epoxy resins containing a polyepoxide having phosphorous and halogen atoms chemically bound to the polyepoxide molecules.

Reactive epoxy compounds containing either phosphorous or halogen atoms may be mixed with other epoxy resins to reduce their flammability. One group of compounds which has been used in flame retardant epoxy resins is the nuclear halogenated bisphenols such as the tetrabromobisphenols and their epoxy ethers. A phosphorous compound which has been used in a similar manner is the adduct of a phosphoric acid and a polyepoxide. The epoxy groups in these compounds enable them to react with conventional epoxy resin curing agents, producing a flame retardant resin. Prior to this time a single reactive polyepoxide containing both phosphorous and halogen atoms has not been available which would produce a flame retardant resin having suitable physical properties.

We have discovered a flame retardant polyepoxide having both phosphorous and halogen atoms in the molecule. Thus, our flame retardant polyepoxide embodies the desirable properties of both phosphorous and halogen atoms in a single reactive compound without a significant loss of physical properties in the cured resin. These flame retardant polyepoxides may be cured and used as the sole resin or they may be blended with flammable epoxy resins such as the diglycidyl ether of 2,2-bis(4-hydroxyphenyl) propane and the mixture cured together.

The phosphorous and halogen containing polyepoxides which may be used in accordance with this invention may be prepared by reacting a phosphorous trihalide such as $PCl_3$ or $PBr_3$ with a polyepoxide as hereinafter identified, then subjecting the adduct to a heat treatment which rearranges the molecular structure to that of a polyepoxypolyhalophosphonate which is reactive with epoxy resin curing agents and has good hydrolytic stability. The phosphorous trihalide is reacted with the polyepoxide either in the absence or presence of a substantially anhydrous inert organic liquid medium. A non-reactive solvent such as benzene or dichlorobenzene may be used to lower the viscosity of the reaction mixture.

There are many polyepoxides which may be reacted with the phosphorous trihalide. Among the polyepoxides which may be used are diglycidyl ether, butadiene dioxide, vinyl cyclohexene dioxide, diglycidyl ether of ethylene glycol, 2,2-bis(2,3-epoxypropoxyphenyl)propane (commonly known as the diglycidyl ether of bisphenol A) and the like.

Each halogen atom in the phosphorous trihalide can react with an epoxide group, therefore the reaction mixture should contain at least three moles of the polyepoxide per mole of the trihalide. The reaction may be conducted in the presence of an excess of the polyepoxide, with the unreacted portion being removed from the adduct by vacuum distillation.

The initial adduct or polyepoxypolyhalophosphite may be produced by charging the polyepoxide to a reactor then raising the temperature to a level slightly below the boiling point of the polyepoxide and adding the phosphorous trihalide slowly while stirring the mixture. For best yields an excess of the polyepoxide should be used, preferably from about 6 to 10 moles of the polyepoxide per mole of phosphorous halide. After the reaction has been continued for about two hours, the excess epoxide may be stripped from the mixture, leaving the initial adduct or phosphite compound. The reaction of phosphorous tribromide with the polyepoxide is more sensitive towards polymerization than the corresponding chloride. Thus, while the reaction with $PCl_3$ may be carried out advantageously at a temperature in the range of 30–40° C., the reaction with $PBr_3$ should be conducted near 0° C. to avoid polymerization of the adduct.

The rearrangement of the adduct to the hydrolytically stable phosphonate can be effected by heating the adduct at a temperature in the range between 150 and 250° C. for a period of about 3 to 60 minutes, preferably 190°–200° C. for about 5 minutes, the optimum time being dependent primarily on the temperature level. A method which has been found to be particularly useful in producing the intramolecular rearrangement is that of pumping the adduct through a coil reactor with the temperature and residence time in the coil being selected to provide the desired degree of rearrangement and the minimum amount of polymerization. For example, the adduct of diglycidyl ether and phosphorous trichloride was passed through a coil reactor at 195° C. at a rate which provided a 5 minute contact or residence time. Infrared analysis of the product indicated at least 96 percent of the adduct had been rearranged to the phosphonate. Substantially complete rearrangement of the $PBr_3$ adduct may be effected at slightly milder conditions. For example, the diglycidyl ether adduct of $PBr_3$ will undergo complete rearrangement (as indicated by infrared analysis) by treatment in a coil reactor for 3 minutes at 150° C.

The polyepoxidepolyhalophosphonates typically comprise a mixture of adducts. The reaction between a polyepoxide and a phosphorous trihalide may be illustrated by the following:

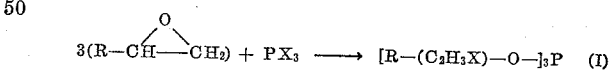

$3(R-CH\overset{O}{-}CH_2) + PX_3 \longrightarrow [R-(C_2H_3X)-O-]_3P$  (I)

where X is a halogen atom and R is the remainder of the polyepoxide molecule and contains at least one terminal epoxide group. The phosphite represented by Formula I, when subjected to conditions which produce intramolecular rearrangement, produces a mixture of molecular forms of the phosphonate which can be represented by the formula:

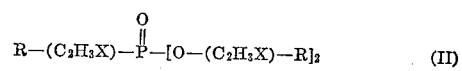

$R-(C_2H_3X)-\overset{O}{\underset{\|}{P}}-[O-(C_2H_3X)-R]_2$  (II)

Another molecular structure which is present in the rearranged mixture (especially in the absence of a solvent) in a minor amount is:

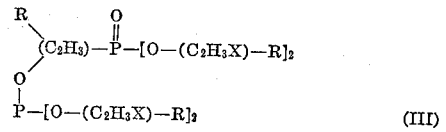

(III)

Also, the initial reaction may yield a small amount of product containing a double ether linkage produced by the homopolymerization between two epoxide groups.

The phosphonates represented by Formulae II and III illustrate the molecular structures in the product wherein the halogen atoms originally combined with the phosphorous atom are retained by the epoxide moiety of the adduct. Additionally the polyepoxy structure is clearly seen since each R in the adduct contains at least one epoxide group.

These flame retardant polyepoxides may be cured in the same manner as other epoxy resins, producing a non-burning thermoset resin. A more desirable manner of using these resins involves blending them with up to 3 parts of a flammable epoxy resin such as 2,2-bis(2,3-epoxypropoxyphenyl)propane, producing, when cured, a non-burning product and having physical properties closely resembling those of the cured flammable resin. These flame retardant resins, either alone or mixed with other epoxy resins, may be cured with any of the common epoxy cross-linking agents such as a primary or secondary polyamine, a Lewis acid catalyst, a carboxylic acid anhydride, or mixtures thereof.

Flame retardant polyepoxides prepared by rearranging the adducts of diglycidyl compounds with phosphorous trichloride and phosphorous tribromide were blended with an epoxy resin and the mixtures cured to produce thermoset resins. Table I presents data pertinent to the preparation of these cured resins. Their physical properties are listed in Table II. The epoxy resin which was blended with the flame retardant polyepoxides was a diglycidyl ether of bisphenol A having an epoxy equivalent weight of 172–178 and a viscosity at 25° C. in the range from 4000 to 6400. The phosphonates used in Samples 1–3 were the rearranged adducts of a phosphorus trihalide and diglycidyl ether. Samples 4 and 5 used the rearranged adducts of the diglycidyl ether of 2,2-bis(4-hydroxyphenyl)propane and PCl$_3$.

TABLE I.—RESIN COMPOSITIONS

| Sample No. | Phosphonate | | Epoxy Resin, Percent | Curing Agent | Percent | Cure Schedule | | | |
|---|---|---|---|---|---|---|---|---|---|
| | Halide | Percent | | | | Initial | | Final | |
| | | | | | | Hrs. | ° C. | Hrs. | ° C. |
| 1 | Cl | 27.6 | 28.6 | HHPA | 43.8 | 2 | 90 | 4 | 150 |
| 2 | Cl | 27.6 | 52.3 | MDA | 20.1 | 16 | 27 | 4.5 | 165 |
| 3 | Br | 36.9 | 43.5 | MDA [1] | 19.6 | 16 | 27 | 5.0 | 90 |
| 4 | Cl | 27.6 | 63.0 | DETA | 9.4 | 16 | 27 | 2.0 | 120 |
| 5 | Cl | 27.4 | 52.4 | MDA | 20.2 | 16 | 27 | 4.5 | 165 |

[1] 1.5% benzyl dimethyl amine added as a cure accelerator.
HHPA = Hexahydrophthalic anhydride. MDA = Methylene dianiline. DETA = Diethylenetriamine.

TABLE II.—RESIN PROPERTIES

| Sample No. | HDT, ° F. | CY, p.s.i. | Flexure Strength, lbs. | Rockwell Hardness | Arc Resist., Sec. | Flammability |
|---|---|---|---|---|---|---|
| 1 | 208 | 15,270 | 15,200 | 100 | 75 | Non. |
| 2 | 276 | 16,901 | 9,840 | 108 | 10 | Non. |
| 3 | 240 | 16,400 | 16,000 | 107 | 62 | Non. |
| 4 | 211 | 15,408 | 10,688 | 100 | | Non. |
| 5 | 276 | 16,901 | 9,846 | 108 | | Non. |

HDT = Heat distortion temperature. CY = Compression yield strength.

The data of Table II clearly illustrate the compatability of these flame-retardant phosphonates with an epoxy resin. In addition to producing flame retardant resins having good physical properties, these mixtures did not have the milky appearance frequently obtained with high concentrations of less compatible retardants. Also, the surfaces of the resins do not become discolored upon exposure to moisture, as happens when the flame retardant is a halogenated compound having poor hydrolytic stability. The flammability of the resin samples reported in Table II was determined according to the procedure set out in ASTM D–635–56T. The arc resistance was determined according to ASTM D–495–58T.

The calculated theoretical weight percent phosphorous and chlorine in Samples 1 and 2 are 1.6 and 5.6, respectively. The corresponding phosphorous and bromine contents of Sample 3 are 1.7 and 13.4, respectively. These samples were non-flammable whereas a similar epoxy resin rendered flame retardant by 23 weight percent bromine attached to the aromatic nucleus of bisphenol A and cured with 20 parts methylene dianiline per hundred parts resin, was self-extinguishing in about 3 seconds. Thus, the halogen-containing epoxy phosphonates produce a less flammable resin with a lower content of halogen plus phosphate atoms than is obtained with the nuclear halogenated epoxies.

We claim:
1. A flame-retardant thermosettable epoxy resin consisting essentially of a polyepoxypolyhalophosphonate produced by the reaction of a polyepoxide containing more than one 1,2-epoxy groups per molecule and a phosphorus trihalide in the proportions of 3 moles of polyepoxide for each mole of trihalide to form a halogen containing adduct followed by heating said adduct at a temperature in the range from 150° to 250° C. for a period between 3 and 60 minutes to cause rearrangement of said adduct into said phosphonate.

2. A resin according to claim 1 wherein said phosphorus trihalide is phosphorus trichloride and said polyepoxide is diglycidyl ether.

3. A hard thermoset, non-flammable resin produced by reacting a polyepoxypolyhalophosphonate of claim 1 with a crosslinking agent for epoxy resins.

4. A flame-retardant epoxy resin mixture consisting essentially of a polyepoxypolyhalophosphonate as claimed in claim 1 with up to 3 parts of a flammable epoxy resin per part of said polyepoxypolyhalophosphonate.

5. A flame-retardant epoxy resin mixture as claimed in claim 4 wherein said flammable epoxy resin is 2,2-bis(2,3-epoxy propoxyphenyl)propane.

6. A process for producing a flame-retardant thermosettable epoxy resin consisting essentially of reacting a polyepoxide containing more than one 1,2-epoxy groups per molecule and a phosphorus trihalide in the proportions of at least 3 moles polyepoxide for each mole of trihalide to produce a halogen containing adduct and then subjecting said adduct to an elevated temperature of 150° to 250° C. for a period of 3–60 minutes to rearrange said adduct into a polyepoxypolyhalophosphonate.

7. The process according to claim 6 wherein said polyepoxypolyhalophosphonate is mixed with up to 3 parts of a flammable epoxy resin per part of said phosphonate, then cured with an epoxy resin crosslinking agent to produce a thermoset non-flammable resin.

References Cited

UNITED STATES PATENTS 2,938,877  6/1954  Mack _____ 260—45.7
2,916,473  6/1955  Bullock et al. _____ 260—830

MURRAY TILLMAN, *Primary Examiner.*

P. LIEBERMAN, *Assistant Examiner.*